United States Patent [19]

Sauer

[11] E Re. 31,201

[45] Reissued Apr. 12, 1983

[54] LOCKING CONNECTION FOR SUPPORTING GRID SYSTEMS

[75] Inventor: Gale E. Sauer, Williamsville, N.Y.

[73] Assignee: Donn Products Incorporated, Westlake, Ohio

[21] Appl. No.: 69,774

[22] Filed: Aug. 27, 1979

Related U.S. Patent Documents

Reissue of:

[64] Patent No.: 3,922,829
Issued: Dec. 2, 1975
Appl. No.: 397,432
Filed: Sep. 14, 1973

[51] Int. Cl.[3] ..... E04C 2/42
[52] U.S. Cl. ..... 52/667
[58] Field of Search ..... 52/667, 484, 664

[56] References Cited

U.S. PATENT DOCUMENTS

| | | | |
|---|---|---|---|
| 3,084,401 | 4/1963 | Findlay | 52/667 X |
| 3,193,063 | 7/1965 | Brown et al. . | |
| 3,221,466 | 12/1965 | Downing, Jr. et al. | 52/726 |
| 3,221,846 | 12/1965 | Brown et al. . | |
| 3,297,345 | 1/1967 | Downing, Jr. . | |
| 3,396,997 | 8/1968 | Adams | 52/484 X |
| 3,501,185 | 3/1970 | Brown et al. . | |
| 3,565,474 | 2/1971 | Stumbo et al. . | |
| 3,584,904 | 6/1971 | Lickliter | 52/667 X |
| 3,606,417 | 9/1971 | Rousey | 52/667 X |
| 3,675,957 | 7/1972 | Lickliter et al. | 52/667 X |
| 3,746,379 | 7/1973 | Sauer | 52/667 X |

*Primary Examiner*—Carl D. Friedman
*Attorney, Agent, or Firm*—Christel, Bean & Linihan

[57] ABSTRACT

A first support member having a web with a slot therein and a second support member having a web provided with an integral locking connector extending axially therefrom for insertion in the slot. The connector has a snap locking finger provided with an edge inclined relative to a true vertical for positive locking engagement against one side of the first support member web. Interlocking means are provided on the opposed faces of a pair of second support member connectors inserted through the slot for locking the second support members against axial separation.

7 Claims, 8 Drawing Figures

Fig. 1.
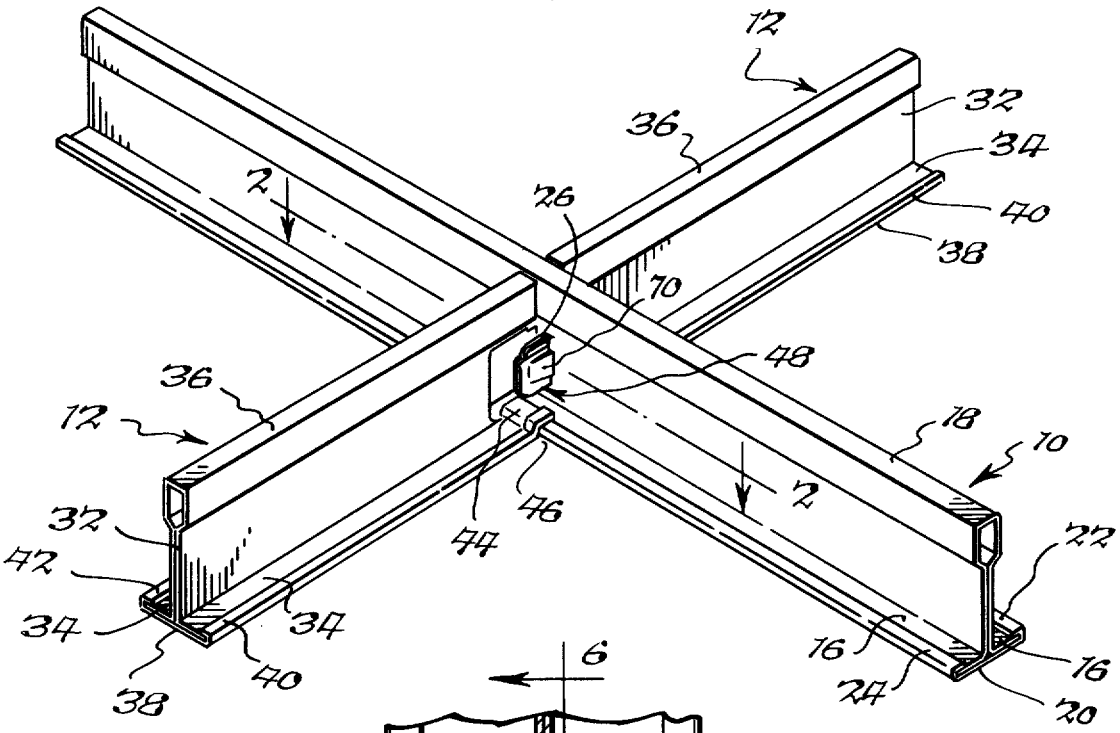
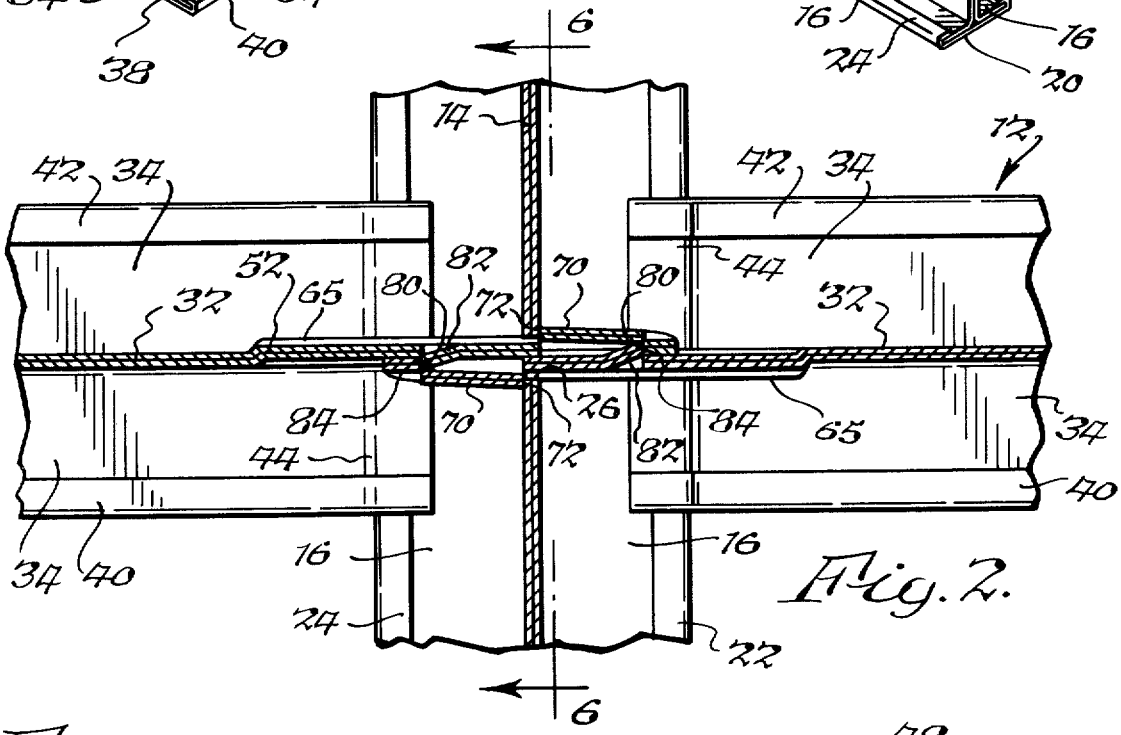
Fig. 2.
Fig. 3.
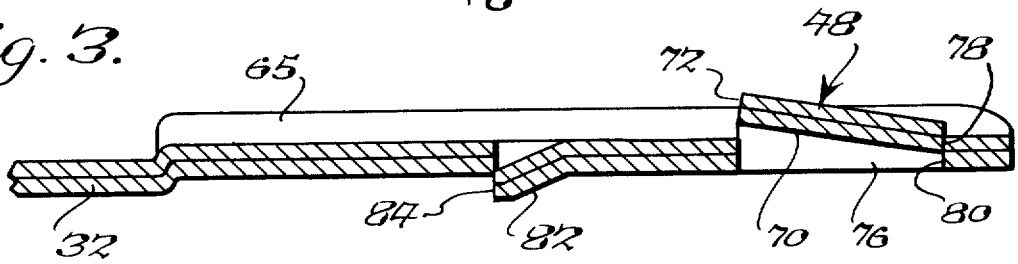

LOCKING CONNECTION FOR SUPPORTING GRID SYSTEMS

Matter enclosed in heavy brackets [ ] appears in the original patent but forms no part of this reissue specification; matter printed in italics indicates the additions made by reissue.

BACKGROUND OF THE INVENTION

This invention relates generally to structural connector elements and, more particularly, to rigid locking connections between support members used in supporting grid systems.

While not limited thereto, the present invention is particularly adapted for use in ceiling tile supporting grid systems of the type comprising a plurality of parallel spaced main grid members and cross grid members extending transversely between the main grid members and having end portions insertable through said main grid members and interlocking therewith. In attempting to provide a strong, rigid tile supporting grid construction, various types of locking connectors have been proposed for these cross grid member end portions. A common expedient is to form resilient locking fingers struck out laterally from the body of the connector to provide a vertical abutting edge facing away from the leading end of the connector and adapted to engage behind the web of the transversely extending main grid member. Since the resilient locking finger must pass through the slot of the main grid member and is then snapped laterally outwardly out of the plane of the connector body, it is apparent that a slight clearance will exist between the vertical locking edge of the locking finger and the main grid member web adjacent the slot thereof. While this clearance between each intersecting pair of grid members may be minute, it is cumulative along the entire span of the grid supporting construction, resulting in a generally loose supporting grid system.

Also, a problem often is presented with such finger locking arrangements where building code specifications require a high pull-apart resistance in disengaging the cross grid members from the main grid members.

SUMMARY OF THE INVENTION

Accordingly, a primary object of the present invention is to obviate the above noted disadvantages by providing an improved support member locking connector formed with a novel snap locking arrangement assuring positive engagement with an intersecting support member for improved rigidity therebetween.

Another object of this invention is to provide the foregoing connector with opposed portions in bearing engagement against the opposite sides of an intersecting support member in the final assembled relation therewith.

A further object of the present invention is to provide an improved locking connection interlocking opposed support member connectors to an intersecting support member and to each other for resisting axial separation of the support member connectors.

The improved locking connection of the present invention is characterized by the provision of a main support member having a slot in its web for receiving a pair of locking connectors extending from and formed integral with opposed cross support members, each connector having a stop shoulder for engagement against one side of the main support member. Each connector also is provided with a locking finger struck out of the web of the connector and provided with a locking edge inclined relative to a true vertical for assuring engagement of at least a portion thereof with the other side of the main support member to form a tight connection therewith. Axially spaced locking shoulders on opposed faces of the side-by-side related connectors are interlockingly engaged for locking the cross support members against axial separation.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a fragmentary, perspective view of intersecting tile supporting members incorporating the locking connection of this invention;

FIG. 2 is an enlarged, fragmentary, horizontal sectional view of the assembled members, taken about on line 2—2 of FIG. 1;

FIG. 3 is an enlarged, fragmentary, horizontal sectional view of one cross support member, showing details of the locking connection thereof;

DETAILED DESCRIPTION OF AN ILLUSTRATED EMBODIMENT

Figure 4:
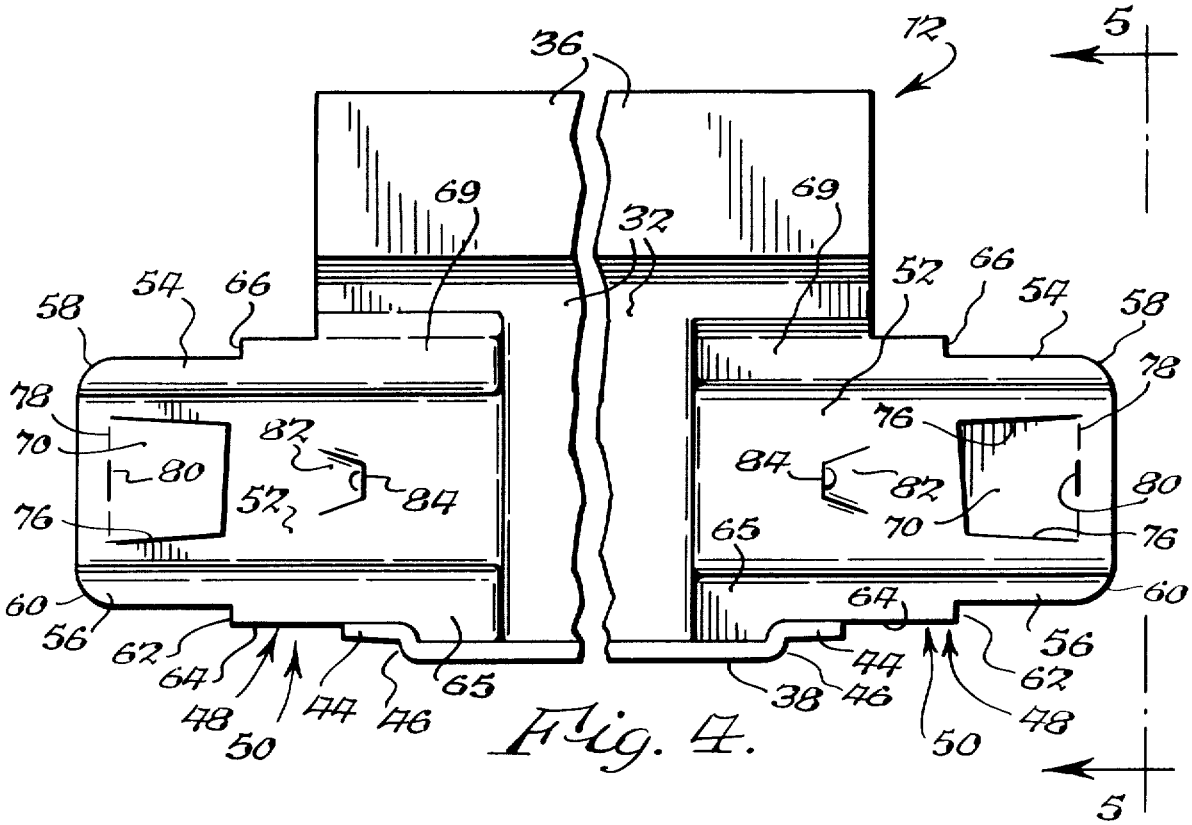
FIG. 4 is an enlarged side elevational view of a cross support member incorporating locking connectors of this invention, being broken away for ease of illustration.
Figure 5:
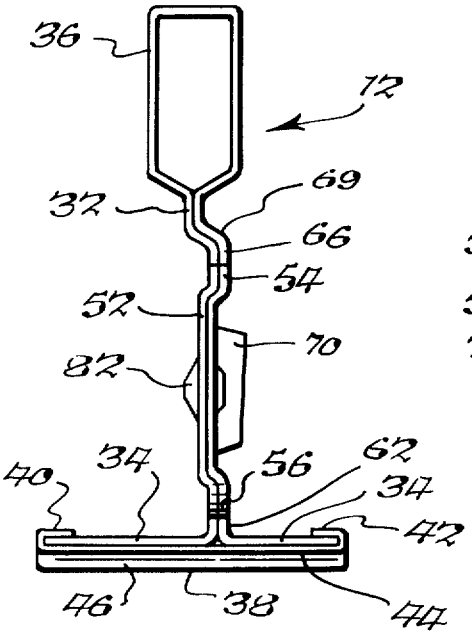
FIG. 5 is an end elevational view of the cross support member of FIG. 4, looking in the direction of arrows 5—5 in FIG. 4.

Referring now in detail to the illustrative embodiment depicted in the accompanying drawings, there is shown in FIG. 1 a ceiling tile supporting grid system incorporating locking connectors of the present invention and comprising a main T support member, generally designated 10, detachably connected to a pair of cross T support members, generally designated 12. The main T member 10 can be conveniently fabricated from a single piece of any suitable material, preferably an inexpensive, lightweight metal such as soft steel for example, and is formed to provide a generally vertical double-walled web portion 14 upstanding from laterally projecting, tile supporting flanges 16 on opposite sides therof and surmounted by a generally rectangularly box-shaped, longitudinally extending, reinforcing bead 18. A cap in the form of a decorative strip 20 underlies the opposite flanges 16 and has marginal edges 22 and 24 bent up and over the lateral edges of flanges 16 for securing the parts in an assembled relation.

Figure 6:
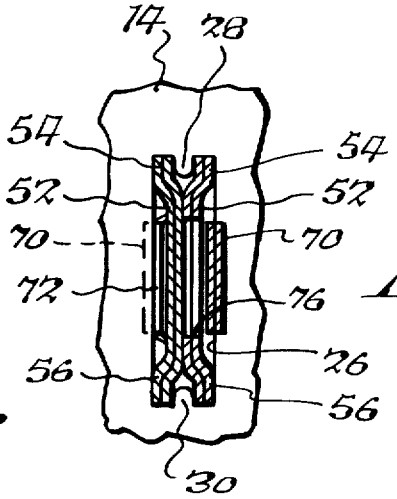
FIG. 6 is a fragmentary, vertical sectional view, taken about on line 6—6 of FIG. 2.

Web portion 14 is provided at spaced intervals with rectangular, normally vertical slots 26 for the reception of the locking connectors of cross T members 12, only one such slot being illustrated in the drawings. As shown in FIG. 6, slots 26 are generally H-shaped, being formed with downwardly and upwardly projecting tabs 28 and 30, respectively, at the top and bottom of the slot which serve as partitions or separators between the two cross T members 12 in the assembled joint.

Each cross T member 12 can be similarly fabricated from a single piece of any suitable material, such as soft steel by way of example, and formed to provide a normally vertical, double walled web portion 32 upstanding from laterally projecting tile supporting flanges 34 and surmounted by a generally box shaped, longitudinally extending, reinforcing bead 36. It should be understood that reinforcing members 18 and 36 can take various shapes in transverse cross-section, such as a flat horizontal strip, a square box-shaped configuration, or a curved or rounded bulb shape, as desired. Flanges 34 are capped by a decorative cover strip 38 having reversely bent marginal edges 40 and 42 folded over the lateral edges of flanges 34 for securing strip 38 in the assembled relation.

The opposite ends of supporting flanges 34 are provided with upwardly offset lips 44 (FIG. 4) joined to flanges 34 by shoulders 46 normally abutting the lateral edges of the main grid supporting flanges 16. Lips 44 are adapted to overlie and rest on tile supporting flanges 16 of main T support member 10 in the assembled relation.

Cross T members 12 are provided at their opposite ends with locking connectors, generally designated 48, extending axially outwardly from the opposite ends of each cross T member 12 and formed integral therewith. Connectors 48 at the opposite ends of each cross T member 12 are slightly offset from web portion 32 in opposite lateral directions, as clearly evident in FIG. 4. Connectors 48 each include a tongue, generally designated 50, projecting axially beyond the ends of cross T member 12, and each tongue 50 is channel shaped in cross section and comprises a recessed web body 52 and opposed longitudinally extending offset portions 54 and 56. The channeled configuration of tongues 50 serves to mechanically reinforce them and adds rigidity thereto. The leading ends of offset portions 54 and 56 are rounded, as shown at 58 and 60 in FIG. 4, to facilitate insertion of tongue 50 into slot 26 of main T web 14. Portions 54 and 56 are offset from the plane of web body 52 and when a pair of oppositely directed tongues 50 are inserted into slot 26 in a side-by-sie relation as shown in FIG. 6, the opposed web bodies 52 abut and urge the outer opposite surfaces of offset portions 54 and 56 against the sides of slot 20 to form a tight and substantially rigid connection preventing rotation or twisting of tongues 50 within slot 26.

Tongues 50 are formed with a stop shoulder 62 projecting downwardly from the lower edge of offset portion 56 and adapted to abut one side of web portion 14 of main T support member 10 below slot 26 in the assembled relation. The portion of offset portion 56 rearwardly of stop shoulder 62 is increased in depth as shown at 64 and extends rearwardly into web portion 32, merging into the lower portion of an elongated embossment 65 which is formed in web portion 32 adjacent the end thereof and oriented generally parallel to tongue 50. Also, an upper shoulder 66 projects upwardly from the upper offset portion 54 and lies in a vertical plane spaced slightly rearwardly of stop shoulder 62 for limiting the extent to which connector 48 can be inserted in an inclined orientation into slot 26 as will hereinafter be more fully explained. The portion of upper offset portion 54 rearwardly of shoulder 66 is increased in depth as shown at 68 and extends rearwardly into web portion 32, merging into the upper portion of an elongated embossment 69 which is formed in web portion 32 adjacent the end thereof and oriented generally parallel to tongue 50. Embossments 65 and 69 not only provide mechanical reinforcements for tongue 50 but also prevent lateral deflection of such tongue in the assembled joint.

Web body 52 of channeled tongue 50 is provided with a locking spring finger 70 struck out therefrom and having a web engaging edge 72 for locking engagement behind web portion 14 of main T support member 10 on the opposite side thereof from stop shoulder 62. It is a particular feature of this invention that edge 72 is inclined from the upper portion 74 thereof downwardly and forwardly toward the leading end of connector 48 at an angle relative to a plane normal to the longitudinal axis of connector 48. The spacing between edge upper portion 74 and stop shoulder 62 is no greater than, and can be slightly less than, the thickness of web portion 14 to insure a tight connection between the intersecting T support members 10 and 12. The provision of an inclined edge 72 insures that at least the upper portion 74 of edge 72 will positively engage against and abut such opposite side of main T member web portion 14 at all times during the fully assembled interlocked relation.

In addition to means for interlocking cross T member 12 to main T member 10, means also are provided for interlocking the cross T members together in a manner preventing them from being pulled apart. To this end, an opening 76 is formed in web body 52 upon the striking out of finger 70, which is bent about a vertical fold line 78. A recessed abutment shoulder 80 (FIG. 3) is formed along fold line 78 approximately centrally therealong and midway between the upper and lower edges of spring finger 70 and faces rearwardly toward web portion 32. Also, an interlocking barb or detent 82 is formed in web body 52 rearwardly of spring finger 70 and projects laterally out of the plane of web body 52 in a direction opposite spring finger 70. Detent 82 is provided with a locking edge in the form of an abutment shoulder 84 facing rearwardly toward the web portion 32 and adapted to seat against recessed shoulder 80 of the other opposed cross T connector 48 in the assembled side-by-side relation therewith.

Figure 8:
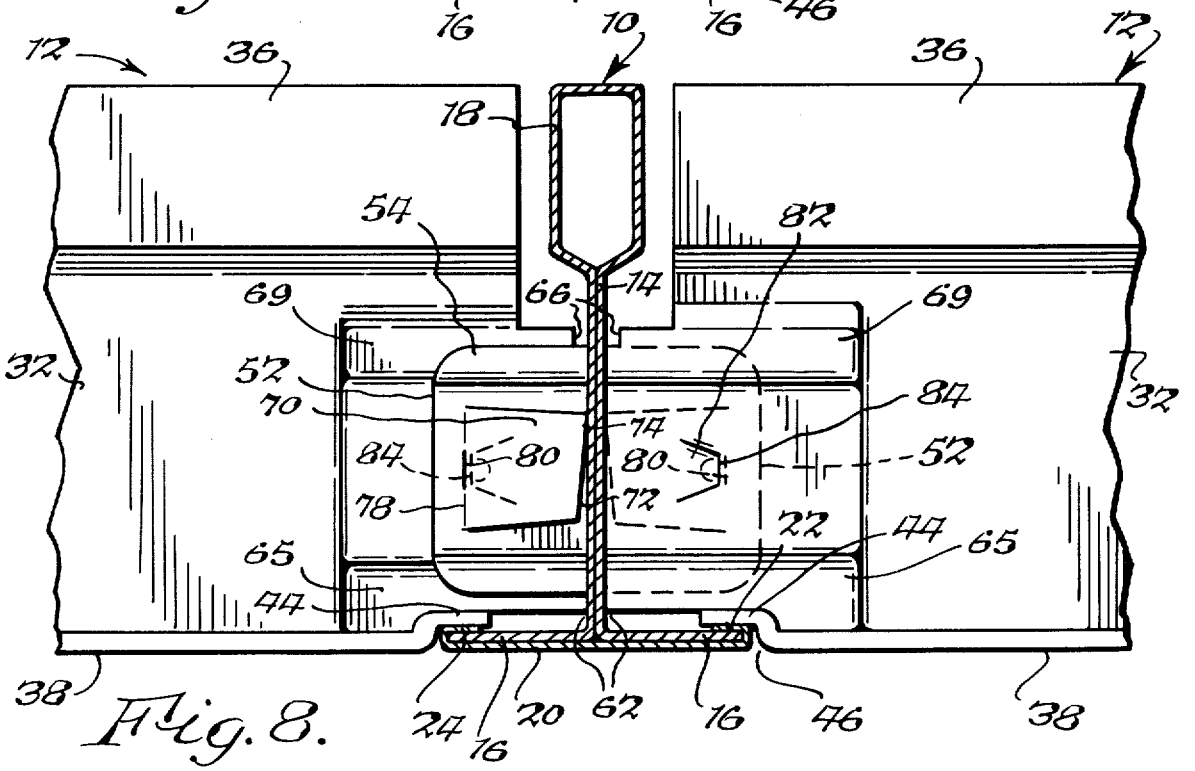
FIG. 8 is a view similar to FIG. 7, but showing the cross support members in their final assembled relation with the main support member.

When assembling the grid system, connectors 48 are inserted into slots 26. In the illustrated assembled joint, connectors 48 from the adjacent ends of aligned cross T support members 12 extend side-by-side through web portion 14 of main T member 10, as shown in FIGS. 1, 2 and 8. Stop tabs 28 and 30 are vertically aligned, and divide each slot 26 into a connected pair of slot portions, allowing connectors 48 to be inserted into each slot 26 from opposite sides of main T member web portion 14.

Figure 7:
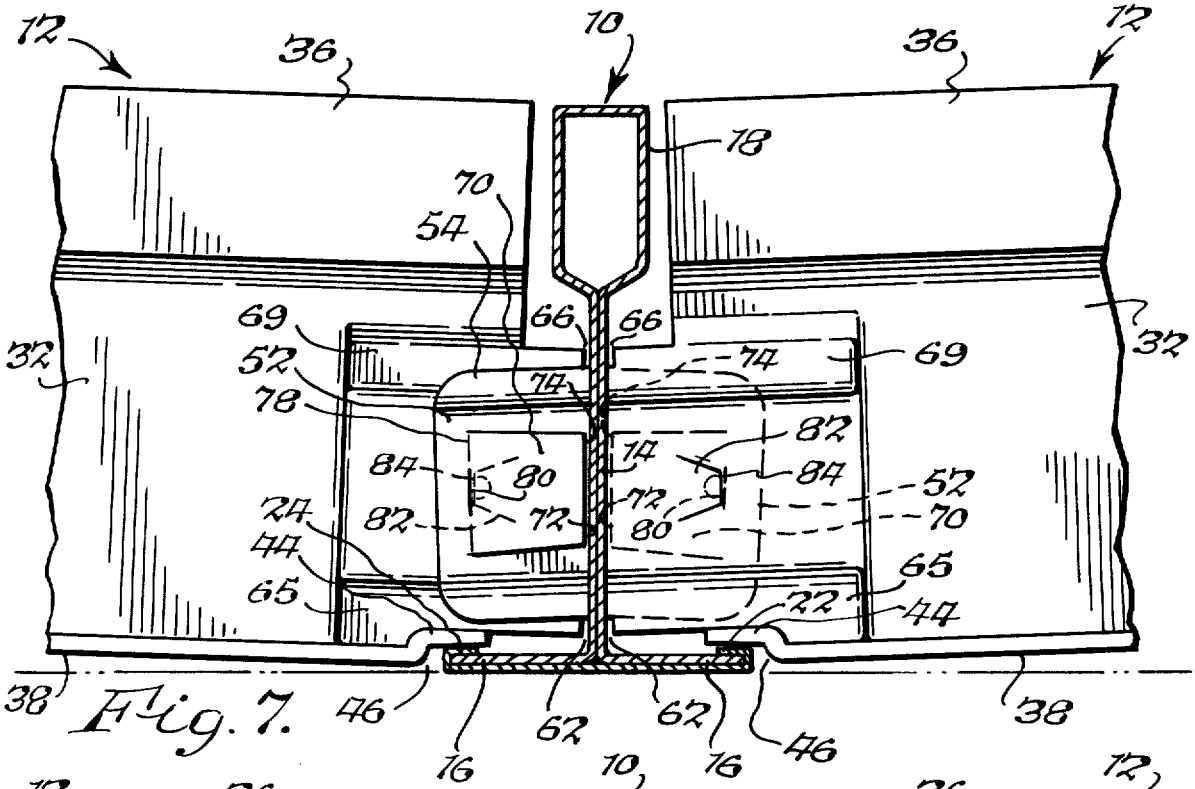
FIG. 7 is a fragmentary view, partly in elevation and partly in vertical section, illustrating the mode of inserting the cross support member connectors through the main support member slot.

When inserting connector 48 through its side of slot 26, it is necessary to incline cross T member 12 slightly relative to a horizontal plane, as shown in FIG. 7 for example, whereby the leading end of connector 48 is pointed downwardly and the inclined edge 72 is oriented in a generally vertical plane parallel to main T member web portion 14. As cross T member 12 is inserted in this inclined orientation into its side of slot 26, the outer side of finger 70 bears against the main T member portion 14 defining that side of slot 20 and finger 70 is cammed out of the way, inwardly toward web body 52 into opening 76, permitting finger 70 to pass through slot 20. The resiliency of finger 70 permits deflection by such camming action without taking a permanent set. The forward end portion of tongue 50 is confined between tabs 28, 30 and the side of slot 26. Further insertion of connector 48 through its side of slot 26 in this inclined orientation causes finger 70 to pass completely therethrough past web portion 14 so that edge 72 clears the latter, allowing the resiliently displaced finger 70 to snap laterally outwardly away from web body 52 behind web portion 14. Shoulder 66 limits the extent to which connector 48 can be inserted through slot 26 in this inclined orientation. After finger 70 clears slot 26 and is sprung laterally outwardly, cross T member 12 is pivoted downwardly about a fulcrum defined by the lower edge of slot 26 from its inclined position to a generally horizontal position. This brings stop shoulder 62 into engagement against one side of main T member web portion 14 and causes the upper portion 74 of edge 72 to be reversely swung into locking engagement against the opposite side of web portion 14 as shown in FIG. 8, preventing withdrawal of connector 48 from slot 26 and holding the associated cross T member 12 connected to main T member 10. In this locked position, shoulder 62 and upper edge portion 74 bear against the opposite sides of web portion 14, clamping the same therebetween to insure a tight, self sustaining connection between the intersecting T support members 10 and 12 and maintains them in a right angular relation without any clearance or play therebetween. Also, offset lip 44 of flanges 34 engages against and seats on flange 16 of main T member 10 with shoulder 46 seating against the flange edge.

Connector 48 of the other cross T member 12 is inserted through the other side of slot 26 in the same inclined manner from the opposite side of main T member 10 to form a rigid joint. When such other cross T member 12 is pivoted into a horizontal position to bring its respective locking edge portion 74 into engagement with the main T member web portion 14, detent 82 of each connector 48 is received in opening 76 of the other connector 48 with its respective locking edge 84 interlocking with the abutment shoulder 80 formed along the finger fold line 78 of the other connector 48, preventing withdrawal of cross T members 12 away from each other. Thus, each cross T member 12 is interlocked with the intersecting main T member 10 to form a tight joint therewith and is interlocked with the other opposed cross T member 12 at two axially spaced points to positively prevent separation of the two away from each other. Web portion 32 of both cross T members 12 on opposite sides of main T member 10 lie in a generally common plane in the fully assembled relation with their respective tongues 50 disposed in a side-by-side relation to form a rigid locking connection with main T member 10.

In order to disconnect cross T support member 12, such member 12 is tilted upwardly to swing upper portion 74 of locking finger edge 72 away from main T member web portion 14 while simultaneously disengaging shoulders 80 and 84 of one cross T member 12 from shoulders 84 and 80 of the other cross T member 12, thereby disconnecting cross T members 12 from each other. The clearance between shoulder 66 and main T member web portion 14 permits such upward tilting movement of cross T member 12. Finger 70 is then resiliently displaced into its associated opening 76 either by hand or an appropriate tool to move edge 72 from its blocking position behind web portion 14. With finger 70 depressed, connector 48 is easily withdrawn from slot 26 thereby disconnecting cross T member 12 from main T member 10.

From the foregoing, it is apparent that the objects of the present invention have been fully accomplished. An improved locking connector, formed integral with the web portion of a support member, is provided for effecting a strong, rigid joint between transversely extending support members and preventing withdrawal of axially aligned support members away from each other. The locking connector is in the form of an offset tongue of channel shaped configuration and is provided with a locking finger struck out from the recessed portion of the channeled tongue for locking engagement behind the web portion of the main T support member. The locking finger is provided with an inclined locking edge to insure engagement of at least a portion thereof against the main T member web portion to provide a tight joint therebetween. The cross T member is tilted when inserting the connector thereof through the main T member web portion to orient the locking edge parallel thereto for passage of the locking edge past such web portion. After the edge clears the side wall of the main T member slot and the finger snaps laterally outwardly out of registry with the slot, the cross T member is swung to a general horizontal position bringing the stop shoulder 62 into engagement with one side of main T member web portion 14 and at least a portion, specifically, the upper portion 74, of the inclined locking edge 72 into bearing engagement against the opposite side of main T member web portion 14. Moreover, due to the inclination of locking edge 72 and the assurance that at least a portion thereof will abut against the main T member web portion, the distance between edge 72 and stop shoulder 62 needn't be maintained within close tolerances during fabrication, as otherwise is necessary with known locking finger interlocks. In addition to the tight interlock between the main T member and cross T members, the latter are interlocked together by the recessed shoulder 80 and detent shoulder 84 of one cross T member engaging with the detent shoulder 84 and recessed shoulder 80 of the other opposed cross T member. This forms a pair of axially spaced interlocks between the two cross T member connectors 48 and precludes separation of the cross T members away from each other, adding to the rigidity of the joint.

An illustrative embodiment of this invention having been disclosed in detail, it is to be understood that this has been done by way of illustration only.

I claim:

1. A locking connection for supporting grid systems and the like comprising a first support member having a flange and a web upstanding therefrom; said web being provided with a slot; a second support member having a flange and web upstanding therefrom; said second member web being provided with a locking connector extending axially therefrom and insertable through said slot; said locking connector having a first portion engaging one side of said first support member web and a resiliently yieldable second portion having a terminal edge inclined at an angle relative to the plane of said first support member web in the fully assembled relation therewith; said terminal edge having at least a portion thereof engaging against the side of said first support member web opposite said first locking connector portion whereby said first portion and said edge portion simultaneously engage the opposite sides of said first support member web in the fully assembled relation therewith.

2. A locking connection according to claim 1 wherein said resiliently yieldable second portion comprises a finger struck out from the body of said connector along a vertical fold line, said terminal edge being inclined relative to a plane including said vertical fold line for positive engagement against said opposite side of first support member web.

3. A locking connector according to claim 1 wherein said resiliently yieldable second portion is bent about a vertical fold line having a recessed shoulder formed centrally therealong; a laterally projecting detent formed in said connector in axially spaced relation to said recessed shoulder for interlocking engagement with a corresponding but oppositely facing recessed shoulder of another second support member connector extending through said slot.

4. A locking connection according to claim 1 wherein said first connector portion comprises a stop shoulder engaging said one side of said first support member web below said slot formed therein.

5. A locking connection according to claim 1 wherein the distance between said first portion and said terminal edge portion is no greater than the thickness of said first support member web.

[6. A locking connection for supporting grid systems and the like comprising: a first support member having a flange and a web upstanding therefrom; said web being provided with a slot; a pair of second support members each having a flange and a web upstanding therefrom; said second member webs being provided with axially projecting locking connectors insertable from opposite directions through said slot in a side-by-side relation; each of said locking connectors having axially spaced portions engagable against the opposite sides of said first member web for interlocking engagement therewith, and means interlocking said connectors together in an assembled relation preventing relative movement of said second support members away from each other.]

[7. A locking connection according to claim 6 wherein said interlocking means comprises a recessed shoulder and an axially spaced laterally projecting detent formed in each connector for interlocking engagement with the corresponding but oppositely facing detent and recessed shoulder of the other connector.]

8. [A locking connection according to claim 6] *A locking connection for supporting grid systems and the like comprising: a first support member having a flange and a web upstanding therefrom; said web being provided with a slot; a pair of second support members each having a flange and a web upstanding therefrom; said second member webs being provided with axially projecting locking connectors insertable from opposite directions through said slot in a side-by-side relation; each of said locking connectors having axially spaced portions engageable against the opposite sides of said first member web for interlocking engagement therewith; means interlocking said connectors together in an assembled relation preventing relative movement of said second support members away from each other and* wherein one of said web engaging portions comprises a resiliently yieldable finger struck out from the body of each connector and having a terminal edge inclined at an angle relative to the plane of said first support member web in the fully assembled relation therewith for engagement of at least a portion thereof with one side of said first support member web in said fully assembled relation therewith.

9. A locking connection according to claim 8 wherein the other of said web engaging portions comprises a stop shoulder engagable with the other side of said first support member web.

[10. A locking connection according to claim 6 wherein the distance between said web engaging portions is no greater than the thickness of said first support member web.]

* * * * *